United States Patent [19]

Hurn

[11] 3,871,258

[45] Mar. 18, 1975

[54] WOOD WORKING APPARATUS

[75] Inventor: James Hurn, Rowley, England

[73] Assignee: Hurn Brothers Engineering Limited, Bath, Somerset, England

[22] Filed: Feb. 5, 1974

[21] Appl. No.: 439,935

[30] Foreign Application Priority Data
July 2, 1973 United Kingdom.............. 6085/73
July 2, 1973 United Kingdom.............. 6085/73

[52] U.S. Cl....................... 83/255, 83/210, 83/282, 83/365, 83/371, 83/422
[51] Int. Cl............................................. B26d 5/20
[58] Field of Search ............ 83/209, 210, 255, 282, 83/365, 371, 422

[56] References Cited
UNITED STATES PATENTS

| | | | |
|---|---|---|---|
| 2,652,864 | 9/1953 | Anguera ............................... | 83/371 |
| 2,669,262 | 2/1954 | Stevens................................. | 83/255 |
| 3,246,550 | 4/1966 | Galey et al......................... | 83/365 X |
| 3,466,958 | 9/1969 | Munson ............................. | 83/209 X |

*Primary Examiner*—J. M. Meister
*Assistant Examiner*—Fred A. Silverberg
*Attorney, Agent, or Firm*—Shoemaker and Mattare

[57] ABSTRACT

This invention relates to wood working apparatus which includes conveying and clamping means located between upstream and downstream work stations, each of which essentially includes at least one cross-cutting saw although one or both work stations may include additional working tools, the clamping and conveying means essentially includes an endless belt conveyor, an upper horizontal run of which moves over a metal platen. Idler pressure roller means bear down on the workpiece in the direction of the upper run of said belt where it runs over said metal platen. The aforementioned cross-cutting saws on the infeed and outfeed sides of the apparatus operate in fixed vertical planes and optionally there is provided on the downstream side of the downstream fixed saw, an additional saw operating in a vertical plane but whose position is adjustable towards and away from said last mentioned fixed saw.

9 Claims, 4 Drawing Figures

(I)

(II)

(III)

(IV)

(V)

(VI)

(VII)

WOOD WORKING APPARATUS

This invention relates to apparatus for cutting elongate timber workpieces accurately to length.

In the Specification of British Pat. No. 1,307,819 there was proposed a method of and an apparatus for performing working operation on elongate components in which a conveying means was located on the upstream side, in the sense of workpiece conveyance, of a tool station; and in a preferred embodiment a further conveying means was located on the downstream side of the working station with the two conveying means being driven in synchronism.

The conveying means in such prior arrangement comprised driven rollers on which the timber workpiece rested as it was conveyed and worked on.

In such a system accuracy depends upon a number of factors, including the circumferences of the rollers being exactly according to specification, the degree of free play in the drive means to the rollers and the frictional engagement between each roller and a workpiece resting thereon.

All these factors will have effect in ensuring accurate positioning or otherwise of the trailing ends of long workpieces being advanced through the work station. If significant loss of accuracy is experienced, this may necessitate replacement of the drive rollers or of components of the transmission thus entailing extensive dismantling of the apparatus.

it has also been found when working with wood that due to the differences in deformability of the surface regions of successive different lengths of wood it is difficult to obtain repeated results of acceptably equivalent accuracy.

According to the present proposal the conveying and clamping means is located between upstream and downstream work stations, each of which essentially includes at least one cross cutting saw although one or both work stations may include additional working tools. The present invention is also characterised by a number of other important features among which principally the use of an endless belt conveyor whose upper run moves over a metal platen and idler pressure rollers serving to hold a workpiece against said upper run and said metal platen are of importance.

The invention has for a further object to provide wood working apparatus in which flawed regions may be readily removed from elongate timber workpieces.

Timber is at present such an expensive commodity that the waste forms an extremely expensive part of a saw shop or saw mill operation. The initial timber baulks successively delivered to a cross cutting machine may be of widely differing lengths, and numbers of differently cut widths and lengths must be produced from the initial baulks with optimum use of timber and hence minimum waste. The problem is further complecated, if the timber contains flaws of knots which require to be severed from the baulks.

It is clearly advantageous if the flaw cutting operation and the cutting to length operation with the latter being performed to produce optimum results and minimum wastage, can be integrated, as opposed to being entirely different operations.

To this end, use is increasingly being made of programming mechanisms which can perform a computing function to control operation of cross cutting machines. In this way data from a first cross-cut saw mechanism constituted as a flaw cutting machine, the data relating to the output of the flaw cutting machine (that is to the cut lengths free of flaws), can be fed to the programming mechanism which in turn controls a further cross-cut saw machine to which the output is subsequently fed, all such that the second machine automatically process the timber to produce the optimum number of sawn timber planks or pieces of the required lengths with minimum wastage.

Such programming machines can operate at very high speeds and it is desirable that the saw cutting machines which actually operate on the timber can respond with a high degree of speed and accuracy to the control given by the programming mechanism.

Accordingly the invention has for one particular object to provide apparatus whereby a succession of timber lengths may be accurately and rapidly cross cut as may be desired with manual intervention during such working operations being at a minimum.

The invention has for a further object to provide a machine which is readily susceptiable of control by a programming device and which can operate at a high degree of speed and accuracy and with optimum usage of timber.

In satisfaction of the above additional objects of the invention, there may be optionally included in the apparatus, in addition to the fixed cross-cutting saws on both the upstream and downstream sides of the conveying and clamping means, adjacent to the fixed saw on the downstream side, a further saw which is moveable in the conveying direction and which may also be moved in the opposite direction towards or away from the adjacent fixed cross-cut saw.

The present invention will be described by way of example with reference to the accompanying diagrammatic drawings in which:

FIG. 3 is a diagrammatic representation showing one method of operation of the apparatus depicted in FIGS. 1 and 2; while.

Figure 1:
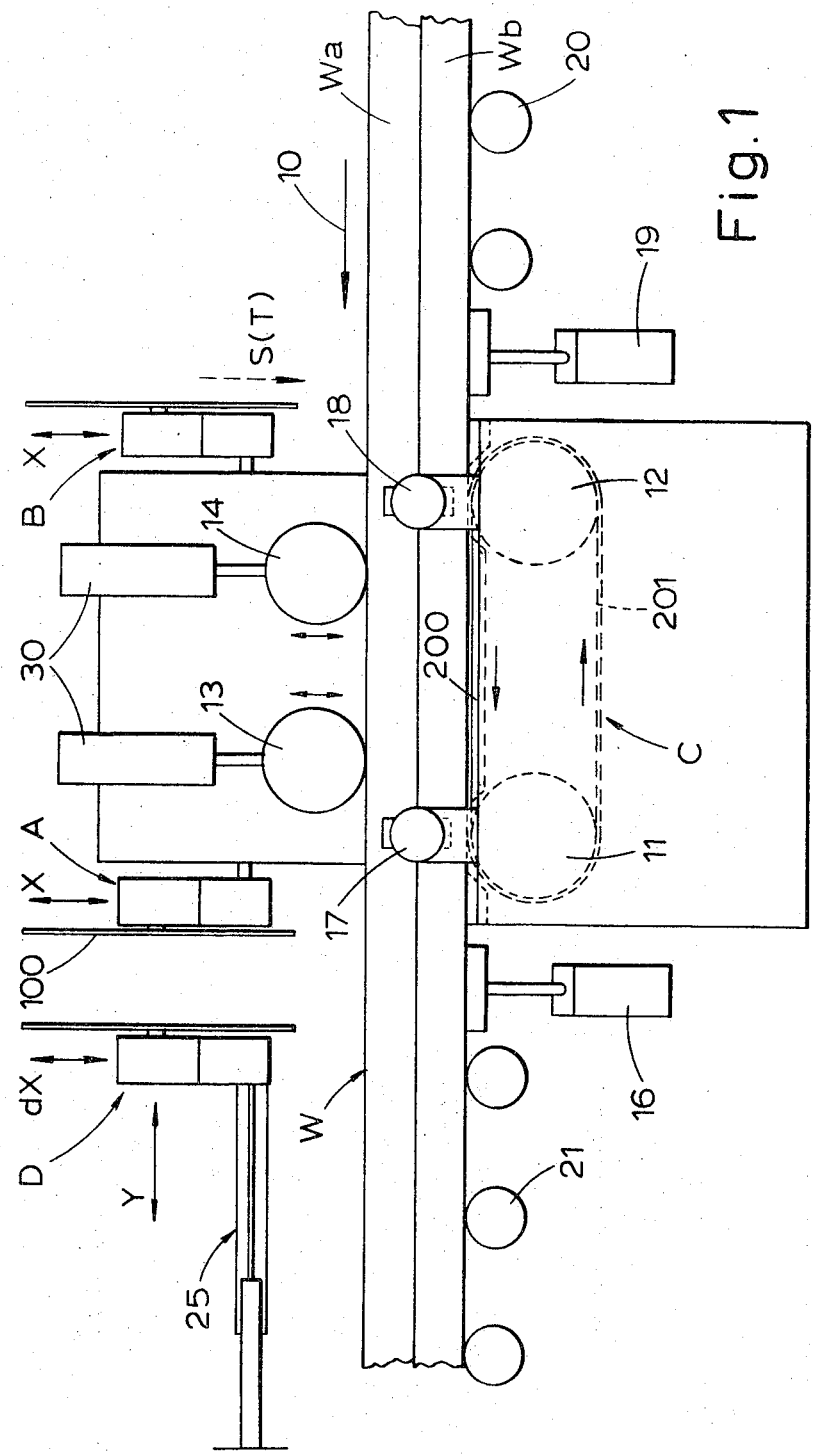
FIG. 1 is a schematic side view of timber working apparatus according to the invention.
Figure 2:
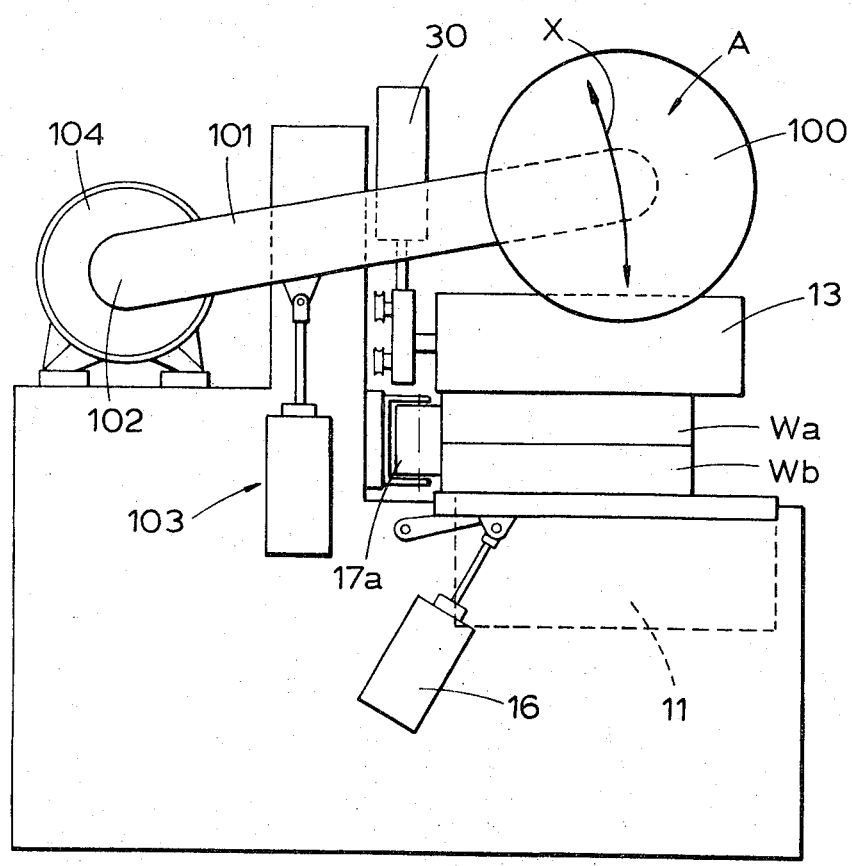
FIG. 2 is an end view in the direction of the arrow II of FIG. 1.

Referring first to FIGS. 1 and 2 the apparatus diagrammatically illustrated includes two cross-cutting saws generally designated A and B located respectively on the outfeed and infeed sides of a conveying and clamping device, generally designated C.

The saws A and B operate at fixed locations longitudinally of the conveying direction, represented by the arrow 10 in FIG. 1, through the conveying and clamping device C.

Optionally, and as depicted in FIG. 1, and as will be further described with reference to FIG. 4, a third saw D, may be located on the outfeed side of the first saw A and such third saw D will be adjustably moveable longitudinally of the conveying direction as indicated by the arrow Y in FIG. 1, whereby its operative location may be adjusted or varied in the conveying direction 10 relative to the fixed operative location of the first saw A.

The third saw D may be moved fore and aft in the direction indicated by arrow Y to vary its distance from the saw A by a worm and gear mechanism, generally designated 25.

Each of the cross-cutting saws A and B is of known form and is moveable to and from a rest position in the direction of the arrow X, as indicated in FIGS. 1 and 2 to sever a workpiece. The operative plane of movement of the optional additional saw D will be parallel to the planes of movement of the fixed saws A and B and is indicated at $dX$.

As is shown more particularly in FIG. 2 the saw A comprises a saw blade 100 carried on an arm 101 pivotally about an axis 102 under the control of a pneumatic or hydraulic piston and cylinder assembly, generally designated 103 for movement in the direction of the arrow X.

The rotary saw blade 100 will be driven by chain or belt in known manner from a drive motor 104.

The conveying and clamping device depicted in FIGS. 1 and 2 includes a belt conveyor, preferably an endless chain conveyor, generally designated 201, the upper run of which runs over a fixed metal platen 200.

The endless chain conveyor 201 is engaged, by means of cooperating sprockets and links with each of two rollers 11 and 12.

The upper run of the chain conveyor 201 extending over the metal platen 200 may, for example, be 150 cm in length and 25 cm in width.

In preferred embodiments of the invention the rollers 11 and 12 are driven in synchronism by worm drive or leadscrew means from a common worm drive gear box (not shown) which will in turn be driven by a positional motor (also not shown), such drive system being of any well known form commonly employed in machine tools.

A pair of idler pressure rollers 13 and 14 act from above against at least one workpiece located on the upper run of conveyor chain 201 in its region running over platen 200 to urge said workpiece against said upper run and said platen.

In the embodiment diagrammatically depicted in FIGS. 1 and 2 two workpieces $Wa$ and $Wb$ are superposed and rest on the upper run of the chain conveyor over the platen 200 and the idler pressure rollers 13 and 14 maintain the superposed workpiece in abutment with the chain conveyor.

The idler pressure rollers 13 and 14 are raised and lowered by a pneumatic or hydraulic piston and cylinder device generally designated 30.

Lateral clamping means, generally designated 17 and 18 are arranged to exert side pressure on the workpiece or workpieces and such lateral clamping means preferably include rollers, one of which is indicated at 17a in FIG. 2.

Bottom clamp means 16 and 19 are arranged to exert clamping pressure from below against the workpiece supported on the upper run of the conveyor chain 201 and urged against said run by the idler pressure rollers 13 and 14.

It will be noted that the axes of the idler pressure rollers are spaced apart over a distance which is smaller than that separtating the axes of the rollers 11 and 12 and that said idler pressure rollers 13 and 14 are disposed to act in the direction of the region of the upper run of the endless chain conveyor 201 which runs over the metal platen 200.

20 and 21 respectively indicate infeed and outfeed conveyor means which may take any known conventional form for example, they may comprise driven rolls or a belt or a chain conveyor system.

It is essential that the drive rollers 11 and 12 are driven in synchronism and that the endless conveyor chain 201 moves with the drive rolls without significant play.

Accordingly, the chain conveyor is suitably an inverted tooth, Morse-type chain conveyor engaged by sprocket teeth on the drive rollers 11 and 12. Moreover the leadscrew means driving the drive rollers 11 and 12 are advantageously employed such that sufficient opposing torques are applied to the two rollers to maintain the upper run of the conveyor passing over the rollers 11 and 12 in tension. This can be achieved by means of a positional gear box having two output leadscrews respectively driving the rollers 11 and 12.

The drive rolls, as previously explained, are driven in synchronism by known drive apparatus. However, such known drive apparatus will in turn be controlled by a programming mechanism also of known form and such programming mechanism will also control the operation of the various saws, idler pressure rollers and clamp means. A suitable programming mechanism which has been very successfully employed is a Model 960A Computer System, manufactured by Texas Instruments Limited.

Information as to the location of a leading or trailing end of a workpiece may be transmitted to the programming mechanism either by mechanical trips or by photo-electrical cells, such trips and cells scanning the path of the workpiece or workpieces as movement takes place in the conveying direction 10.

Additional tools may be provided, also under the control of the said programming mechanism, and such additional tools, which may for example comprise drills, tenon saws or trenching tools may be arranged to operate from above or below, on one or both of the infeed or outfeed sides of the conveying and clamping device, generally designated C, or such additional tools may be arranged to operate laterally upon a workpiece or workpieces engaged by the conveying and clamping device C.

When the drive rollers 11 and 12 are rotated they will be rotated through a predetermined amount and then be held stationary while the workpiece is first clamped and then a working operation is performed upon it. Thereafter the drive rollers 11 and 12 will be further rotated, following release of the workpiece by the clamping means, through a predetermined amount, again to advance the workpiece whereafter it is again clamped and a working operation performed thereon.

The amount of such successive rotation of the drive rollers 11 and 12 in synchronism will be determined by the aforementioned programming mechanism and it is an important requirement that the successive advance movements which may be imparted to the workpiece may be similar or different from one another, such similarity or difference being determined by the aforementioned programming mechanism.

Figure 3:
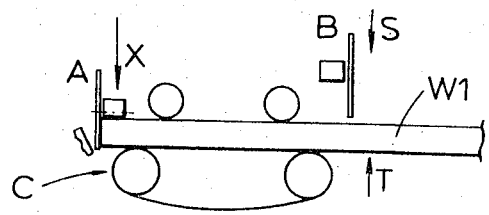
Figure 3:
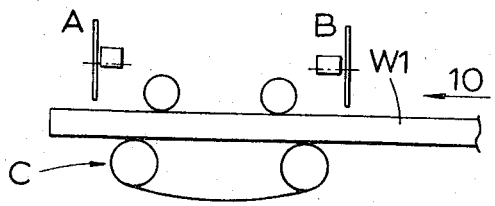
Figure 3:
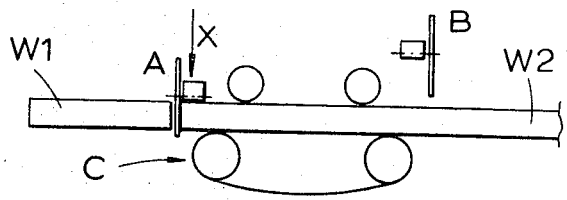
Figure 3:
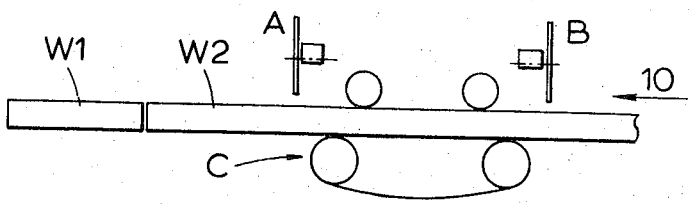
Figure 3:
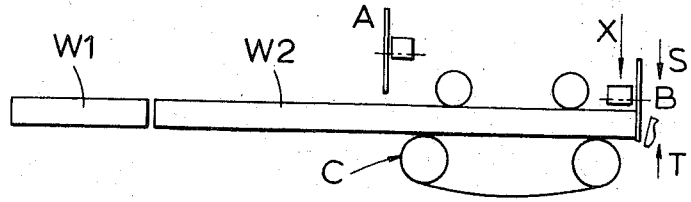
Figure 3:
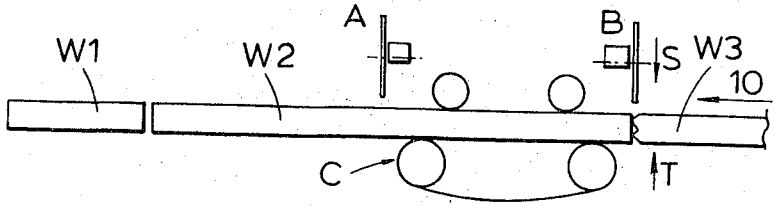
Figure 3:
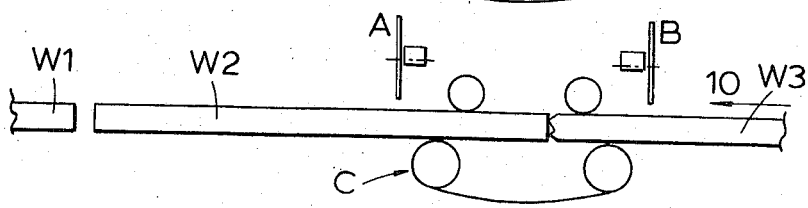

Referring now to FIG. 3 there is here depicted schematically a series of operations, by means of which apparatus such as has been previously described with reference to FIGS. 1 and 2 can be employed to cut an elongate length of timber accurately to length.

Referring to FIG. 3 the workpiece $W_1$ is advanced by the conveying device C in the conveying direction past the saw B and towards the saw A. At some location during this travel in the conveying direction, the position of its leading end will be sensed.

For example, such sensing could be by an optical scanning device, (which may include photo-electric cells), indicated at S in FIG. 3 I or by a mechanical trip indicated diagrammatically at T in FIG. 3 I.

Such sensing means will cause a signal to be fed to the programming mechanism and after predetermined further advance movement of the conveyor, the workpiece will be stopped and held stationary.

At this time the leading end of the workpiece will have passed, in the conveying direction, beyond the operating zone of saw A on the outfeed side of the conveying and clamping device C, and while the workpiece is held stationary, saw A will be operated to sever the leading end of the workpiece, the saw being then returned to its rest position.

The workpiece $W_1$, as a consequence of the preceding operation, will now have a squarely cut leading end.

Moreover, due to the initial triggering signal, and the subsequent movement imparted to the workpiece, the position of the leading end of the workpiece $W_1$ will be known to the programming mechanism.

Accordingly, following disengagement of the means holding the workpiece stationary, and as shown in FIG. 3 II, the conveying device will now be caused to advance the workpiece through a predetermined distance.

Referring now to FIG. 3 III, following such predetermined advance movement the conveying device will be stopped; the workpiece will be held stationary; and saw a will again be operated to sever the workpiece.

This operation will be effective to leave a squarely cut trailing end on workpiece $W_1$ and simultaneously, a second workpiece $W_2$ will have been formed which has a squarely cut leading end whose location in the conveying direction is known by the programming mechanism. The position of the leading end of the workpiece may be checked by appropriately placed scanning means and a signal fed to the programming mechanism.

Referring to FIG. 3 IV following release of the workpiece $W_2$ this can now be advanced through a predetermined distance until the position depicted in FIG. 3 V is reached. At this point saw B can be operated so that firstly the workpiece $W_2$ is correctly cut to length and secondly, its trailing end is squared off.

This creates a gap which may be utilized to sense the leading end of a following workpiece by means of the scanning devices S or T.

Referring to FIGS. 3 VI and 3 VII, these depict a further workpiece $W_3$ being advanced in the conveying direction 10 and having reached the stage depicted in FIG. 3 VI, the leading end of the workpiece $W_3$ will have been located by the sensing means (as diagrammatically indicated at S or T in FIG. 3 I ) whereafter, the stage of operation previously described with reference to FIG. 3 stages I to V will be repeated.

At any predetermined instant, as a workpiece is being advanced in the conveying direction 10, it may be stopped and held stationary by the conveying and clamping device C and some other working operation performed upon it, for example, a drilling operation, such additional working operation being under the control of the programming mechanism.

The preceding description relating to FIG. 3 is particularly applicable with sawn timber of good quality and having an acceptable number of flaws therein. However, as has been referred to hereinbefore, much rough sawn timber presently available on the market, contains flaws and it is desirable to remove such flaws while optimising the use of the serviceable timber which is available.

In this latter respect, apparatus as depicted in FIG. 1 and having the optionally additional cross-cutting saw D is of particular utility.

By way of example, the use of such apparatus equipped with such an optionally additional saw D will now be described with reference to the schematic arrangement showing seven steps of operation in FIG. 4.

Figure 4:
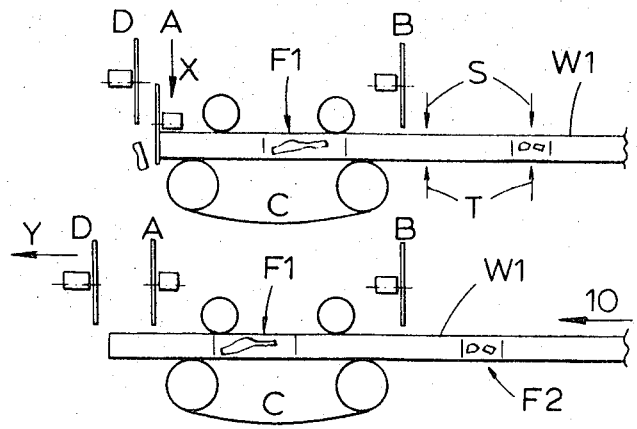
FIG. 4 is a diagrammatic representation of an alternative method of operating the apparatus depicted in FIGS. 1 and 2.
Figure 4:
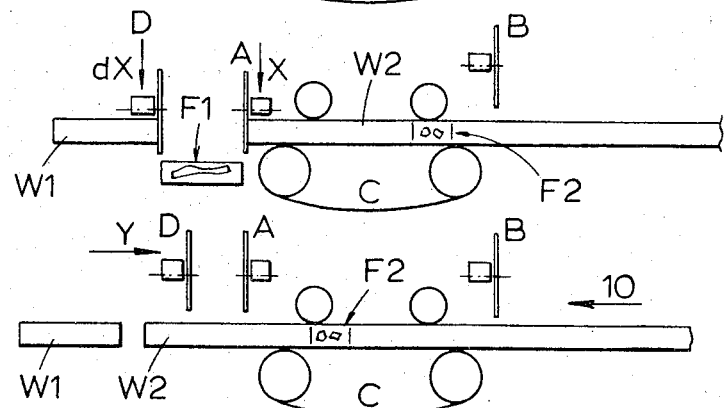
Figure 4:
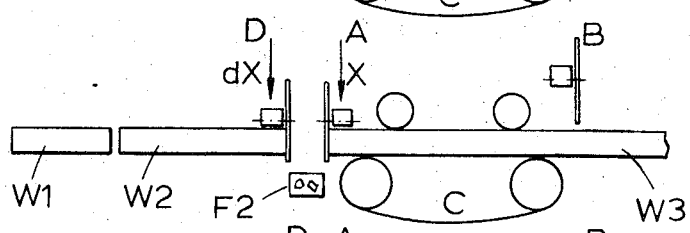
Figure 4:
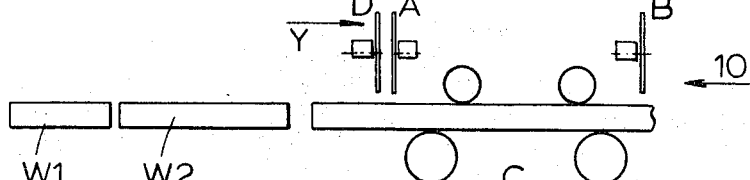
Figure 4:
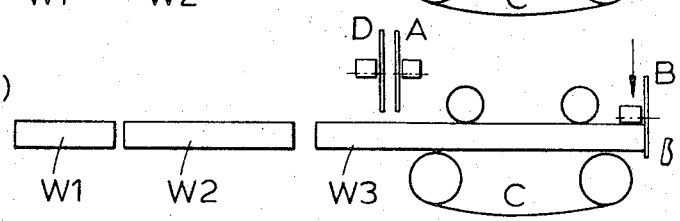

As will be seen in FIG. 4, the conveying and clamping device C advances successive workpieces in successive steps past the saws A, B and D. In the first stage of the operation depicted in FIG. 4, the saw D has been moved close to the fixed saw A and saw A has been operated to sever and square off the leading end of a workpiece $W_1$.

The next operation required is to remove the flaw indicated at $F_1$ of the workpiece $W_1$.

At the stage depicted in FIG. 4 I, the squared off leading end of workpiece $W_1$ is shown.

By preprogramming or by manual intervention, for example, by means of scanning means above the input conveyor (20 in FIG. 1), which scan the timber for marks manually placed thereon, to delimit the longitudinal extent of a flawed region, an appropriate signal can be fed to the programming mechanism whereby the length of the flaw $F_1$ is established, the required data is known to the programming mechanism.

Accordingly, in the next stage of operation (FIG. 4 II) the workpiece $W_1$ is advanced by the conveyor means C so that the rear end of the flawed region $F_1$ is located immediately on the outfeed side of the fixed saw A. Simultaneously, the moveable saw D is moved away from the fixed saw A over a distance corresponding to the previously ascertained length of the flawed region $F_1$, which distance may be incremented to optimize the cut length of workpiece $W_1$ to predetermined requirements.

Referring to FIG. 4 III the workpiece advance is stopped; the workpiece is held stationary; and the saws A and D operate simultaneously to sever the flawed region $F_1$, thereafter returning to rest their positions.

It will be noted that the operation as so far defined with reference to FIG. 4 has two significant advantages.

Firstly, the movement of saw D is executed simultaneously with workpiece advance thus saving time.

Secondly the workpiece $W_1$ has a squared off rear end while simultaneously a following workpiece $W_2$ is formed having a squared off leading end.

The next step required, in the embodiment schematically illustrated, is to sever a flawed area $R_2$ from the workpiece $W_2$.

As depicted in the schematic drawing, this flawed area $F_2$ has less length in the conveying direction than the flawed area $F_1$ previously referred to.

Accordingly, during the fourth stage depicted in FIG. 4, after the workpiece $W_2$ has been released by the clamps, it will be advanced by a predetermined amount as dictated by the programming mechanism until the trailing end of the flawed region $F_2$ is located immediately downstream of fixed saw A.

Simultaneously therewith moveable saw D is moved towards fixed saw A under the control of the programming mechanism, until the distance between saws D and A corresponds to the length of flawed area which it is now required to sever. Such severing operation is depicted in FIG. 4 V and thereby a further workpiece $W_3$ is formed having a squared off leading end.

In the embodiment depicted, the third workpiece $W_3$ has a rough-cut trailing end. Accordingly, the next operation which is required is to square off such trailing end and it is clearly advantageous that this operation is performed by the saw B at the upstream side, in the conveying direction 10, of the conveying and clamping device C.

FIGS. 4 VI and 4 VII depict firstly a state where the workpiece $W_3$ is advanced a predetermined distance as dictated by the programming mechanism and saw B operates to sever and square off the trailing end of the workpiece $W_3$.

With suitable programming, it will be appreciated that optimum use can be made of the timber available to acquire sawn lengths of the required quality at high speed when the device is operated in the manner as above described with reference to FIG. 4.

Moreover, it is envisaged according to the invention that data derived from operation of a machine in the manner as above described with reference to FIG. 4 could be utilised to feed information relating to the output of the machine (that is, information relating to the cut lengths free of all flaws) to the same or a further programming mechanism, which in turn controls a further cross-cut saw machine, such that the second machine automatically processes the timber to produce, accurately cut to length, the optimum number of sawn timber planks or pieces of various required lengths with minimum wastage.

Such second machine could take the form of a machine as depicted in FIGS. 1 and 2 but with the additional moveable cross-cut saw D omitted.

I claim:

1. Apparatus for cutting elongate timber workpieces accurately to length, which includes a conveying and clamping device comprising an endless conveyor belt running in toothed engagement over two spaced apart drive rollers which are driven in synchronism through a succession of rotary movements, each of predetermined amount, at least some of said amounts being different, the upper run of said belt being substantially horizontal and being disposed above a fixed metal platen, a plurality of idler pressure rollers arranged at predetermined times and for predetermined durations to press downwardly towards said upper run of said belt where it passes over said platen, said conveying and clamping device being adapted and arranged to transport a workpiece resting on the upper run of said belt irreversibly but intermittently in a single conveying direction from an infeed side to an outfeed side of the conveying and clamping device, and including at each of the infeed and outfeed sides of said conveying and clamping device a tool station which includes at least one cross-cut saw.

2. Apparatus according to claim 1 wherein each said cross-cutting saw, that is one on the infeed side and one on the outfeed side of the conveying and clamping device, is adapted to operate to sever a workpiece in a vertical plane which is substantially at right angles to the said conveying direction, the vertical planes of operation of each of said two cross-cutting saws being in fixed spaced relationship to one another and to the conveying and clamping device.

3. Apparatus according to claim 2 including in addition on the downstream side, in the sense of the conveying direction, of the fixed saw on the downstream side of the conveying and clamping device, a further cross-cut saw which also operates in a vertical plane, which is at right angles to the conveying direction and including means for moving said additional saw through predetermined distances towards and away from said fixed saw on the outfeed side of said conveying and clamping device.

4. Apparatus according to claim 1, wherein the belt conveyor is constituted by an inverted tooth Morse-type chain conveyor engaging sprocket wheels on the said spaced apart drive rollers, and including means for limited free play in the belt conveying system.

5. Apparatus according to claim 4, including a positional gear box driving said drive rollers such that the upper run of said conveyor belt running over said platen is tensioned, said gear box imposing sufficient torque on one of said drive rollers relative to the torque imposed on said other drive roller such that tensioning of said upper run is achieved.

6. Apparatus according to claim 5, wherein leadscrews are employed to transmit drive from said positional gear box to said drive rollers.

7. Apparatus according to claim 1 including said clamping means for holding a workpiece stationary during intervals between said intermittent advance movements in said conveying direction, comprising at least one clamp located between the idler roller adjacent the infeed side of the conveying and clamping system and the fixed saw located on said infeed side.

8. Apparatus according to claim 7 including further clamping means located between the idler on the outfeed side of the conveying and clamping device and the fixed saw on said outfeed side.

9. Apparatus according to claim 3, wherein leadscrew means controlled by a positional gear box are employed to adjust the position of said further saw.

* * * * *